(12) United States Patent
Heinen et al.

(10) Patent No.: US 8,449,637 B2
(45) Date of Patent: May 28, 2013

(54) OIL MIST SEPARATOR OF AN INTERNAL COMBUSTION ENGINE

(75) Inventors: Arno Heinen, Ascheberg-Herbern (DE); Sieghard Pietschner, Greven (DE)

(73) Assignee: Hengst GmbH & Co. KG, Muenster (DE)

( * ) Notice: Subject to any disclaimer, the term of this patent is extended or adjusted under 35 U.S.C. 154(b) by 492 days.

(21) Appl. No.: 12/682,320

(22) PCT Filed: Oct. 9, 2008

(86) PCT No.: PCT/EP2008/008528
§ 371 (c)(1),
(2), (4) Date: Apr. 30, 2010

(87) PCT Pub. No.: WO2009/049818
PCT Pub. Date: Apr. 23, 2009

(65) Prior Publication Data
US 2010/0229510 A1    Sep. 16, 2010

(30) Foreign Application Priority Data

Oct. 12, 2007    (DE) .................. 20 2007 014 378 U

(51) Int. Cl.
*B01D 50/00*    (2006.01)
(52) U.S. Cl.
USPC ............. 55/327; 55/385.3; 55/462; 55/482; 55/495; 123/198 E

(58) Field of Classification Search
CPC ..................................... B01D 50/00
USPC ............ 55/490, 385.3, 495, 327, 482, 462; 123/198 E
See application file for complete search history.

(56) References Cited

U.S. PATENT DOCUMENTS

| | | | |
|---|---|---|---|
| 3,712,030 | A | 1/1973 | Priest |
| 4,627,406 | A | 12/1986 | Namiki et al. |
| 6,309,436 | B1 | 10/2001 | Holch |
| 7,799,109 | B2 * | 9/2010 | Dunsch et al. ........... 55/462 |

FOREIGN PATENT DOCUMENTS

DE    29700579 U1    3/1997

* cited by examiner

*Primary Examiner* — Robert A Hopkins
(74) *Attorney, Agent, or Firm* — Greer, Burns & Crain, Ltd.

(57) ABSTRACT

The invention relates to an oil mist separator of an internal combustion engine, comprising at least one gas-permeable diffusion separation body, through which a crankcase ventilation gas of the internal combustion engine can flow and in which oil mist present in the crankcase ventilation gas can be separated from the gas. The novel oil mist separator is characterized in that in the or each diffusion separation body additionally continuous free gas channels are formed, and that, viewed in the flow direction of the crankcase ventilation gas, behind the gas channels at least one further diffusion separation body, or an impingement separation surface is disposed at a distance from the or each diffusion separation body.

30 Claims, 14 Drawing Sheets

OIL MIST SEPARATOR OF AN INTERNAL COMBUSTION ENGINE

BACKGROUND OF THE INVENTION

The invention relates to an oil mist separator of an internal combustion engine, comprising at least one gas-permeable diffusion separation body, through which a crankcase ventilation gas of the internal combustion engine can flow and in which oil mist present in the crankcase ventilation gas can be separated from the gas.

DE 197 29 439 A1 shows a closed crankcase ventilation system of an engine which must rely on the low-pressure support of a turbo charger inlet to take in leakage gases from the crankcase. The ventilation system includes a coalescer filter which filters the oil particles entrained by leakage gases before they enter into the turbo charger inlet. A relief valve prevents the crankcase from being put under excessive pressure as a result of a counter-pressure caused by either a clogged coalescer filter or by a malfunction of the engine. A low-pressure limiting valve prevents the low pressure support generated by the air inlet in the turbocharger from generating an absolute pressure which is too low. This prevents a pressure imbalance over the seals of the turbocharger. A bypass valve also prevents the crankcase from being set under excessively high pressure, by making the flow of leakage gases pass around the coalescer filter if the pressure in the crankcase becomes too high.

This known crankcase ventilation system evidently requires high technical expenditures because it comprises, in addition to the coalescer filter, two valves which significantly increase the manufacturing expenditures. Another disadvantage with this known ventilation system is seen in the fact that—in a clogged condition of the coalescer filter in which the bypass valve is opened—the leakage gases are no longer cleaned or only to a minor degree from the entrained oil particles or are even discharged uncleaned into the environment.

DE 600 23 217 T2 shows a gas/liquid inertia separator for the removal and fusion of liquid particles from a gas/liquid flow. This separator comprises a housing with an inlet to accept the gas/liquid flow and an outlet to discharge a gas flow. Furthermore, the separator comprises an inertia collector in the housing, comprising a collector surface in the path of the gas/liquid flow and causing a sharp change in direction of the same. The outlet accepts the gas flow after the sharp change in direction. The housing comprises an axial flow path through it, including a first flow path section for the gas/liquid flow between the inlet and a space on the collector surface, and a second flow path section for the gas flow between the space and the outlet. Furthermore, a flow-through filter is provided in the second flow path section which makes a safety filter available which traps gas particles entrained by the gas flow after separation on the inertia collector. The flow path presents precisely two 90° directional changes before entry into the flow-through filter, with a first directional change being arranged in the space at the collector surface and a second directional change in one of the first and second flow path sections, and with the gas flow after the two directional changes flowing axially through the flow-through filter to the outlet. In the housing, a nozzle structure is provided which presents a plurality of nozzles which take up the gas/liquid flow from the inlet and accelerate the gas/liquid flow through the nozzles against the collector surface. The collector surface and the nozzles are sufficiently spaced apart from each other by a space to prevent excessive resistance. The collector surface is a rough, porous collector surface which effects a separation of liquid particles from the gas/liquid flow with a smaller particle size than with a smooth, non-porous impingement surface, and this without the precise limit size for the particle separation of the latter and the collection of liquid particles in the porous collector surface.

Briefly stated, this separator is thus a series connection of an impingement separator and a flow-through filter, with the gas/liquid flow first running through the impingement separator and thereafter through the flow-through filter. Although in the operation of this separator, the largest portion of the oil particles is separated in the impingement separator, a certain portion of oil particles still continues to get into the flow-through filter, however; and consequently, in the course of the separator's operating time, the flow resistance of the flow-through filter increases due to the deposits permanently remaining therein until the flow-through filter is finally completely clogged. In this condition, the separator can no longer function at all, and malfunctions of the appropriate engine occur, unless the flow-through filter is cleaned or replaced in good time within the scope of maintenance measures.

DE 10 2005 043 198 A1 shows a gas/liquid inertia separator for the removal of liquid particles from a gas/liquid flow, with a housing comprising an inlet to accept the gas/liquid flow and an outlet to discharge the gas flow. Moreover, in the housing, the separator has a nozzle structure comprising one or a plurality of nozzle(s) with one or a plurality of opening(s) for accepting the gas/liquid flow from the inlet and for accelerating the gas/liquid flow through it, with one or a plurality of opening(s) of the nozzles providing a total flow through it. The separator further comprises an inertia impingement collector in the housing in the path of the accelerated gas/liquid flow, with the inertia impingement collector causing the separation of the liquid particles from the gas/liquid flow. Moreover, an actuator for a flow change is provided by means of which the total flow through the openings can be changed, preferable as a function of a preset parameter.

It is considered detrimental for this known separator that it comprises with the actuator a mobile, specifically resettable element which is subject to wear and tear in the operation of the separator and which renders the manufacture of the separator elaborate or expensive. Moreover, with moving parts in an oil mist separator, there is always the risk of a functional disorder of moving parts due to the fact that the oil particles and other components entrained in the crankcase ventilation gas have a sticky consistency which aggravates or finally entirely prevents the mobility of the actuator and the parts connected therewith the separator's increasing operating time.

From DE 10 2006 056 789 A1, an inertia impingement device is known which uses a gas flow rate to separate oil particles in the emissions of a crankcase in an internal combustion engine. A housing is here provided having a top side, a bottom side and sidewalls which essentially extend without interruption in between to determine a hollow body which has an inside chamber with an inner surface and an outside room with an outer surface. The top side comprises an opening to enable a flow nozzle extending through it, the nozzle having a diameter W and a constriction which extends over a predetermined distance T and stops at a predetermined distance S across from the bottom side. The nozzle is in fluid connection with the gas flow from the crankcase of the internal combustion engine. The bottom side is arranged in close vicinity to a heat source to serve as a primary impingement device plate. Furthermore, the side walls are provided with secondary impingement device plates which are located at predetermined places along the inner surface and extend into the inside chamber. Finally, a side wall with an opening is provided to enable a gas flow from the crankcase of the internal combustion engine through the housing over the primary impingement device plate, over the secondary impingement device plates and out of the opening in the sidewall to a turbo charger.

This device is a plain impingement separator providing good efficiency for/relatively large oil particles which the crankcase ventilation gas contains. Especially in modern internal combustion engines, however, a finer oil mist consisting of small oil particles increasingly occurs which can be separated only at a reduced efficiency in a plain impingement separator primarily by means of mass inertia forces. This results in an incomplete de-oiling of the crankcase ventilation gas and in a penetration of oil parts through the separator which may result in failures in the internal combustion engine, for example, because components—such as throttle linkages or air flow meters—which are located in an intake tract of the internal combustion engine are oil-contaminated, said tract taking up the gases from the separator. Moreover, the choice of arrangement of this separator is limited such that it must be arranged at a hot place, thus close to parts of the appropriate internal combustion engine which are hot in operation.

SUMMARY OF THE INVENTION

For the present invention, the objective accordingly is to provide an oil mist separator of the initially indicated type which avoids the above presented disadvantages and, with a simple construction and economical manufacturability, has a high separating efficiency, even for fine oil particles, as well as a long maintenance-free period of use and thus prevents, at any time, any unacceptably high pressure in the crankcase of the appropriate internal combustion engine.

According to the invention, this problem is solved with an oil mist separator of the initially indicated type which is characterized in that in the or each diffusion separation body additionally continuous free gas channels are formed, and that, viewed in the flow direction of the crankcase ventilation gas, behind the gas channels at least one further diffusion separation body, or an impingement separation surface is disposed at a distance from the or each diffusion separation body.

According to the invention, the oil mist separator advantageously offers, with a very simple constructional design, a very high percentage of very effective diffusion separation over a very long service period. Depending on the condition of the diffusion separation body, the oil mist is separated in different circumstances between the two separating mechanisms. In a fresh condition of the diffusion separation body, it has a very high permeability so that the largest part of the volume flow of the crankcase ventilation gas flows through the diffusion separation body or bodies, whereby oil mist in the form of oil particles entrained in the crankcase ventilation gas is separated within the diffusion separation body predominantly by means of diffusion separation. The gas speed is very low everywhere, even in the free gas channels, so that even the finest particles are effectively separated by diffusion separation; this effectivity is not possible with a plain impingement separator. In this case, the partial volume flow of the crankcase ventilation gas flowing through the free gas channels plays only a minor role in terms of percentage because this partial volume flow is very small with a low flow resistance of the diffusion separation body. With a diffusion separation body which becomes increasingly clogged within the course of the service period of the oil mist separator—thus with an increasing flow resistance of the diffusion separation body—the partial volume flow of the crankcase ventilation gas flowing through the free gas channels will increase. From this partial volume flow of the crankcase ventilation gas, oil mist separation is provided either by the further, then still less burdened diffusion separation body or by the impingement separation on the impingement separation surface. In the design with two diffusion separation bodies, the crankcase ventilation gas here flows in a fresh condition of the diffusion separation bodies through two series-connected diffusion separation bodies, which thus achieves a particularly high separation efficiency through diffusion separation. The partial gas flow which flows through the free gas channels of the first diffusion separation body will flow—with fresh diffusion separation bodies—subsequently through the further diffusion separation body so that this partial gas flow is also de-oiled by diffusion separation. With increasingly burdened diffusion separation bodies, the gas increasingly flows through the free gas channels which ensures the crankcase ventilation. The crankcase ventilation gas will then still be de-oiled by impingement separation. Thus, the oil mist separator will maintain a high separating efficiency over long service periods through a diffusion separation effect, and an excessive pressure drop over the oil mist separator which might result in an excessive pressure in the crankcase of the appropriate internal combustion engine, will be prevented even after a long operating period and with (an) increasingly burdened diffusion separation (body) bodies. Since the diffusion separation bodies are at a distance from each other or the impingement separation surface is disposed at a distance from the diffusion separation body upstream thereof in the direction of flow with the gas channels, a gap space is kept free which is used for guiding the crankcase ventilation gas. Thus, advantageously, special arrangements are not required either for the design of gas flow paths. Due to the lack of any moving elements in the above described oil mist separator, it can be economically manufactured and is reliable in its function.

It is preferably further provided that the gas channels extend perpendicularly to a surface plane of the diffusion separation body and that the further diffusion separation body or the impingement separation surface extends parallel to the surface plane of the diffusion separation body. In this design, a particularly space-saving design of the oil mist separator is possible.

Another contribution to keep the flow resistance of the oil mist separator low is that the further diffusion separation body or the impingement separation surface to the gas channels of the diffusion separation body comprises at least one gas passage, in a staggered fashion. Here, the gas passage expediently has a flow cross-section which is larger than the flow cross-section of the gas channels. This keeps the pressure drop over the oil mist separator low which is essential for operation since, with internal combustion engines, there is frequently only a minor pressure difference available for operating the oil mist separator.

Another embodiment of the oil mist separator suggests that, viewed in the flow direction of the crankcase ventilation gas, at least a further diffusion separation body or a further impingement separation surface is provided behind the gas passage at a distance from it. In this embodiment of the oil mist separator, the gas flow through the oil mist separator is subjected to a double impingement separation when the diffusion separation body is increasingly burdened. As long as the separation body is still well permeable, separation is provided in the diffusion separation body. Overall, high separation efficiency is guaranteed in every operating condition of the oil mist separator and the diffusion separation body arranged therein.

It is furthermore provided that the impingement separation surface or at least one of the impingement separation surfaces is formed by a closed, gas- and oil-tight impingement plate. In this embodiment, the impingement separation surface can be especially simply produced and integrated into the oil mist separator.

To be able to design the oil mist separator in a particularly compact manner, it is proposed that the diffusion separation body or bodies and the impingement separation surface or surfaces each have a hollow cylindrical form and are arranged concentrically to each other around a center axis. In this embodiment, and with a small construction volume of the oil mist separator, a large surface is made available for the diffusion separation body or bodies which offers good oil mist separation at a low flow resistance.

An alternative proposal provides that the diffusion separation body or the diffusion separation bodies and the impingement separation surface or surfaces are each spirally arranged seen in cross-section.

Another alternative provides that the diffusion separation body or the diffusion separation bodies and the impingement plate or the impingement plates have a flat planar form and are arranged in parallel to each other. In this embodiment, the oil mist separator can be designed particularly flat which can be advantageous in some installation situations.

So that no undesirable deformations of the diffusion separation body or bodies occur in the operation of the oil mist separator, it is furthermore proposed that at least one gas- and oil-permeable supporting body is arranged between the diffusion separation bodies or between the diffusion separation body and the downstream impingement separation surface. This supporting body takes care that the or each diffusion separation body keeps its desired, specified form even in a burdened condition which increases the pressure drop over the diffusion separation body, and that the flow paths in flow direction behind the diffusion separation body are reliably kept open.

Preferably, the supporting body is formed by a three-dimensional grid since such a grid, on the one hand, can be manufactured simply and economically and, on the other hand, reliably achieves the desired effect.

Additionally, the supporting body may have a form and/or structure which has a gas guiding function for the gas flowing through the supporting body and/or a separating function for the oil mist contained in the gas flowing through the supporting body.

The diffusion separation body may comprise bodies of different materials. Essential is that the diffusion separation body is able to separate from the crankcase ventilation gas flowing through it the particularly fine oil particles entrained with it and to store them within the diffusion separation body and/or pass them to an oil discharge within the diffusion separation body. A first preferred embodiment in this respect provides that the or each diffusion separation body comprises at least one fiber or foam body.

Particularly for the purpose of simple manufacturability, it is provided that a material forming a fiber or foam body is sheet-formed in its initial condition and has a smaller thickness than the fiber or foam body, and that the sheet-formed material is wound to the fiber or foam body. The sheet can be directly wound, for example, onto the aforementioned supporting body. Alternatively, there is the possibility to first wind the sheet on an auxiliary body to the fiber or foam body and to then insert the supporting body, after removal of the auxiliary body, into the fiber or foam body.

Another favorable embodiment in manufacturing terms proposes that a material forming the fiber or foam body is sheet-formed in its initial condition and has a thickness corresponding to the thickness of the fiber or foam body, and that the sheet-formed material is wound together in spiral form with the supporting body—also sheet-formed in an initial condition—to the fiber or foam body or to a plurality of fiber or foam bodies. This results in an oil mist separator in which no separate diffusion separation bodies are concentrically arranged to each other; instead, there is a spiral form which results, however, in the same functional properties of the oil mist separator. The number of layers wound over each other can be expediently varied here. A free space is maintained between the windings of the spiral, here by means of the supporting body.

Another suitable embodiment consists of the or each fiber or foam body having the form of a hollow profile, preferably of a hollow cylinder. By graduated diameters, a plurality of bodies can be concentrically arranged to each other as needed.

Particularly for not inherently dimensionally stable fiber or foam bodies, it is proposed that the or each diffusion separation body comprises—in addition to the at least one fiber or foam body—a carrying body carrying the fiber or foam body or bodies.

In another embodiment, the or each fiber body is preferably manufactured of a felt material from thermoplastic or thermosetting plastic fibers or metal fibers or carbon fibers or glass fibers or of a paper material.

Alternatively, the fiber body may be manufactured from a fleece or a fabric or a web or a textile or a knit of thermoplastic or thermosetting plastic fibers or metal fibers or carbon fibers or glass fibers.

The foam body is preferably manufactured of a plastic or metal or glass foam.

Expediently, the foam body may be manufactured of an open-cell thermoplastic or thermosetting foam plastic.

Moreover, the possibility exists that the or each diffusion separation body comprises at least one sinter body.

The above mentioned free gas channels in the diffusion separation body can be differently designed and generated. A first embodiment to this effect proposes that the gas channels are directly molten or welded or drilled or punched or grooved or cut into the material of the fiber body or foam body or sinter body. This design ensures a particularly simple manufacture since no special components for the gas channels need to be permanently provided in the fiber body or foam body or sinter body.

Alternatively, the gas channels can be formed by sleeves inserted into the material of the fiber body or the foam body or sinter body. For this embodiment, the expenditures are actually somewhat higher; however, the inserted sleeves provide the advantage that the gas channels can be produced with particularly exact and permanently durable contours. To secure their positions, the sleeves are suitably fixed in the body as needed, e.g. by gluing or fusion or by collars on both sides.

Instead of in the material of the fiber body or foam body or sinter body, the gas channels may also be arranged in a transition area between at least one front end or edge of the fiber body or foam body or sinter body and an area neighboring the appropriate carrying body. It is thereby particularly easier to achieve a dimensional stability of the gas channels.

One embodiment provides that the carrying body has grooves open toward it which are located on its side facing the fiber body or foam body or sinter body and which are limited by the front end or the edge of the fiber body or foam body or sinter body to the gas channels. Manufacturing will here be particularly simple.

Another embodiment provides that the carrying body has two or several parts and that one carrying body part has, on its side facing the front end or the edge of the fiber body or foam body or sinter body, one or several projecting stud(s) or pairs of studs which—in a connected condition of the carrying body parts—partially push in the fiber body or foam body or sinter body on the edges and thus form the gas channels. Here, the gas channels are formed simply by connecting the carrying body parts with each other.

In an embodiment especially simple to produce, the gas channels present over their entire length a constant cross-section in each case.

The gas channels preferably have a round or polygonal or slit-like cross-section.

To achieve favorable flow conditions with low flow resistances in the gas channels, they can be designed on the inlet side with an admission funnel according to the invention.

A high outflow speed of the crankcase ventilation gas from the gas channels is favorable for the impingement separation on the impingement separation surface in case of heavily burdened diffusion separation bodies. If a particularly high flow speed is to be achieved, the gas channels can be designed on the outlet side with a nozzle-type constriction according to the invention. Moreover, a high gas speed in the gas channels has the advantage that a self-cleaning effect is achieved so that the gas channels virtually cannot be clogged.

To ensure trouble-free operation of the appropriate internal combustion engine even with a heavily burdened diffusion separation body, it is expediently provided that the oil mist separator, particularly the added flow cross-section of all gas channels, is designed and dimensioned such that a maximum admissible pressure drop over the oil mist separator is not exceeded even in case of a heavily or maximum burdened condition of the diffusion separation body or bodies.

If a gas flow through the gas channels is to be prevented in case of a fresh diffusion separation body, there is the possibility that the further diffusion separation body or the yet further diffusion separation body or the impingement separation surface or at least one of the impingement separation surfaces or, in each case, a part thereof is adjustable relative to the gas channels or to the gas passage against a reset force such that—at a differential pressure over the oil mist separator below a specifiable limit value—the gas channels and the gas passage are closed by the further diffusion separation body or the still further diffusion separation body or the impingement separation surface; and that—at a differential pressure over the oil mist separator above a specifiable limit value—the gas channels and the gas passage are opened by displacing the further diffusion separation body or the still further diffusion separation body or the impingement separation surface(s) against the reset force. This resetting is advantageously automatically done without auxiliary facilities or drives, whereby only minor technical expenditures need to be effected to achieve this function. The resettable element here forms a valve body; a spring can generate the reset force, or the valve body itself can be resiliently designed.

Alternatively, at least one separate valve may be allocated to the gas channels or the gas passage, e.g. in the form of a disk valve or a laminar valve.

Due to its above presented arrangements, the oil mist separator may have a service time which is equivalent to the life of the appropriate internal combustion engine. Yet, to be able to nonetheless perform any possibly necessary maintenance of the oil mist separator as fast and as quickly as possible, the invention proposes that the oil mist separator comprises a housing which is closed in operation with a removable housing cover, and that the diffusion separation body or bodies present an exchangeable unit. Removal of the cover renders the diffusion separation body or bodies accessible, and it or they can be removed from the housing, and one or a plurality of new diffusion separation bodies can be installed into the housing just as fast.

The oil mist separator and the appropriate internal combustion engine are preferably parts of a motor vehicle. Especially in this application of the oil mist separator, its benefits come especially to bear—namely its particularly compact design with high efficiency and a reliably durable function.

BRIEF DESCRIPTION OF THE DRAWINGS

In the following, exemplary embodiments of the invention are explained by means of a drawing. In the Figures of the drawing.

DETAILED DESCRIPTION OF THE DRAWINGS

Figure 1:
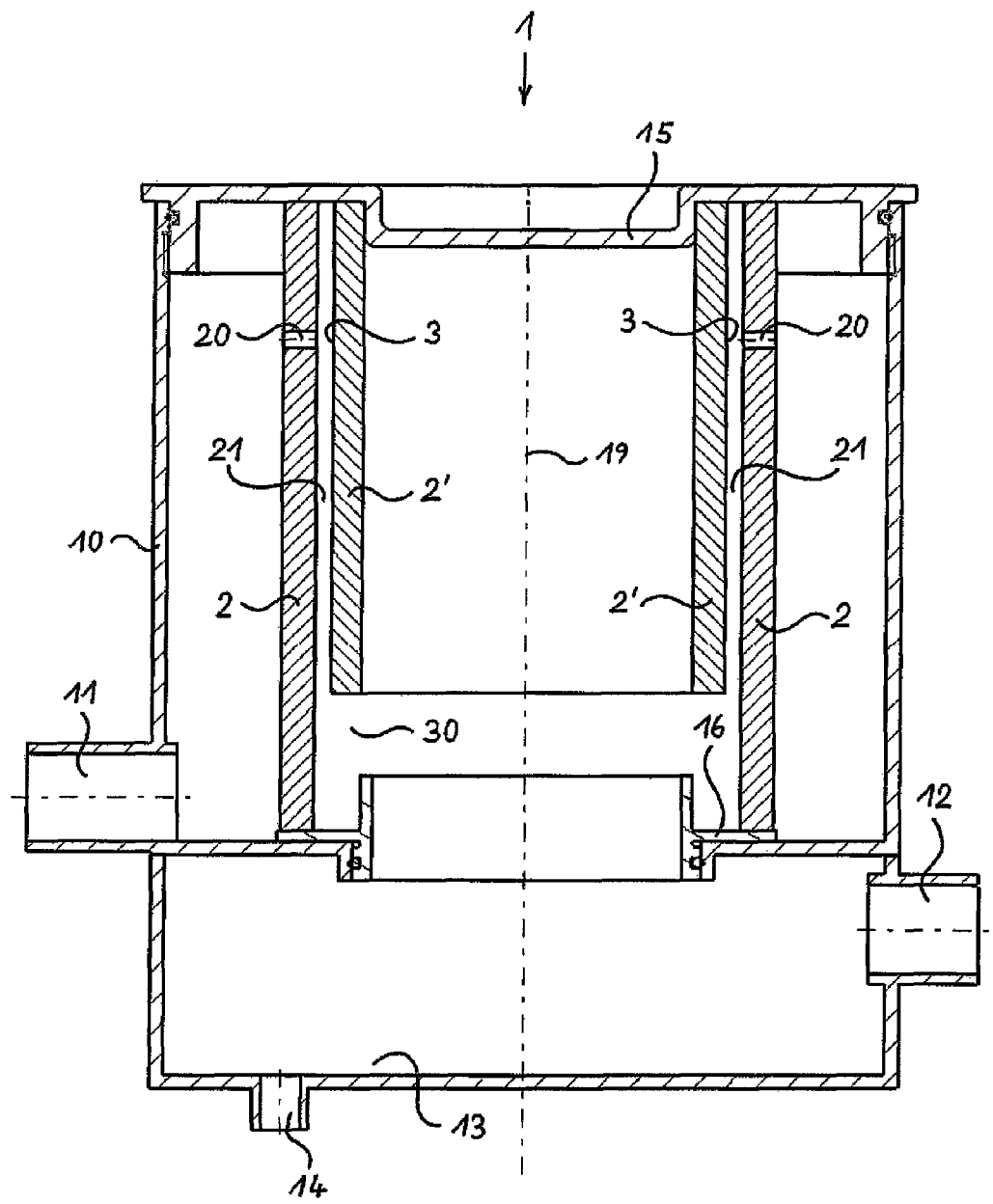
FIG. 1 shows an oil mist separator in a first embodiment, in longitudinal section.

FIG. 1 of the drawing shows an oil mist separator 1 in a first embodiment in a vertical longitudinal section. The oil mist separator 1 comprises a housing 10 with a crude gas inlet 11 for crankcase ventilation gas coming from a crankcase of an appropriate internal combustion engine, a pure gas outlet 12 for de-oiled crankcase ventilation gas, as well as an oil collection area 13 located in the lower area of the housing 10 with an oil drain 14 for oil separated from the crankcase ventilation gas.

On the inside of housing 10, a hollow-cylindrical diffusion separation body 2 is arranged comprising in its upper area a plurality of continuous gas channels 20 distributed over its circumference. The diffusion separation body 2 incidentally consists of a fiber material or foam material or sinter material which is permeable for the crankcase ventilation gas and separates the oil mist entrained in the crankcase ventilation gas in the form of fine oil particles from the gas flow through diffusion separation.

Radially on the inside and at a distance from diffusion separation body 2, a further diffusion separation body 2' is arranged which also has a hollow cylindrical shape but a shorter height than the first diffusion separation body 2. Both diffusion separation bodies 2 and 2' are arranged concentrically to each other and to a center axis 19 of the oil mist separator 1. For positioning, the diffusion separation bodies 2 and 2' are connected—for example glued or fused—with a cover 15 closing the housing 10 on the top side. An annular gap 21 is kept free between the inner circumference of the first diffusion separation body 2 and the outer circumference of the second diffusion separation body 2'.

The outer, taller diffusion separation body 2 rests with its lower front end on a base plate 16 and is also connected with it, preferably glued or fused. The radially inner diffusion separation body 2' ends on the bottom at a distance from the base plate 16. The base plate 16 is broken through in its center to make a flow path available for the de-oiled crankcase ventilation gas to the pure gas outlet 12.

The diffusion separation bodies 2 and 2' here form—together with the cover 15 and optionally additionally with the base plate 16—a connected unit which allows a simple replacement of the diffusion separation bodies 2 and 2' within the scope of maintenance work.

In a fresh condition, the diffusion separation bodies 2 and 2' are not yet burdened with oil and other substances entrained in the crankcase ventilation gas so that they offer low flow resistance for the crankcase ventilation gas. In this condition, the crankcase ventilation gas flows with a far predominant percentage and at a low speed through the diffusion separation bodies 2 and 2', whereby the entrained oil is separated from the gas by diffusion separation. The partial flow of the gas flowing through the gas channels 20 subsequently flows through the second diffusion separation body 2' whereby this partial gas flow is also effectively de-oiled by means of diffusion separation.

Within the diffusion separation bodies 2 and 2' or over their surfaces, the separated oil flows downwardly by the force of gravity and arrives through the open base plate 16 all the way in the oil collection area 13 from where it is preferably returned through the oil discharge 14 to the crankcase of the appropriate internal combustion engine.

After a prolonged operating period of the oil mist separator 1, substances are deposited within the diffusion separation bodies 2 and 2' which permanently remain there and do not flow off. Over time, the flow resistance of the separation bodies 2 and 2' increases accordingly. This brings about an increasingly larger partial flow of the crankcase ventilation gas flowing through the free gas channels 20 in the outer separation body 2. The second diffusion separation body 2' arranged radially inside at a distance from the first diffusion separation body 2 then forms with its surface areas 3 lying radially inside from the gas channels 20 an impingement surface for the crankcase ventilation gas flowing through the gas channels 20. Thus, impingement separation of oil particles from the crankcase ventilation gas takes place in the surface areas 3. Accordingly, an efficient oil mist separation is successful with the oil mist separator 1 in every condition of the diffusion separation bodies 2 and 2', wherein there is first the oil mist separation by means of separation of the oil within the diffusion separation bodies 2 and 2' by means of diffusion separation; with an increasing burden of the diffusion separation bodies 2 and 2', the gas passage through the gas channels 20 increases, with an oil separation also being provided by means of impingement separation in the surface areas 3. This ensures efficient oil mist separation and adequate crankcase ventilation over a very long operating period which prevents failures and damages of the appropriate internal combustion engine.

In a fresh condition of the diffusion separation bodies 2 and 2', the crankcase ventilation gas essentially flows in radial direction from the outside to the inside through the diffusion separation bodies 2 and 2' and then from the inside area of the inside diffusion separation body 2' axially downwardly through the open base plate 16 all the way to the pure gas outlet 12. With increasing burdening of the diffusion separation bodies 2 and 2', an increasing partial flow of the crankcase ventilation gas flows through the gas channels 20 radially from the outside to the inside and then after a sharp deflection in axial direction downwardly through the annular gap 21. The lower end of the inner diffusion separation body 2', spaced apart from the base plate 16, here forms a gas passage for the crankcase ventilation gas coming from the annular gap 21 and de-oiled by diffusion and impingement separation which can then flow on through the open base plate 16 to the pure gas outlet 12.

So that no unacceptably high pressures occur in the crankcase of the appropriate internal combustion engine even with heavily or maximum burdened diffusion separation bodies 2 and 2', the cross-section and the number of gas channels 20 are selected such that even with maximum burdened diffusion separation bodies 2 and 2', adequate discharge of crankcase ventilation gas is still ensured and a maximum allowed pressure drop over the oil mist separator 1 is not exceeded. The gas channels 20 are self-cleaning due to the relatively high gas speeds occurring therein so that no clogging of the gas channels 20 need be expected even after a long operating period.

Figure 2:
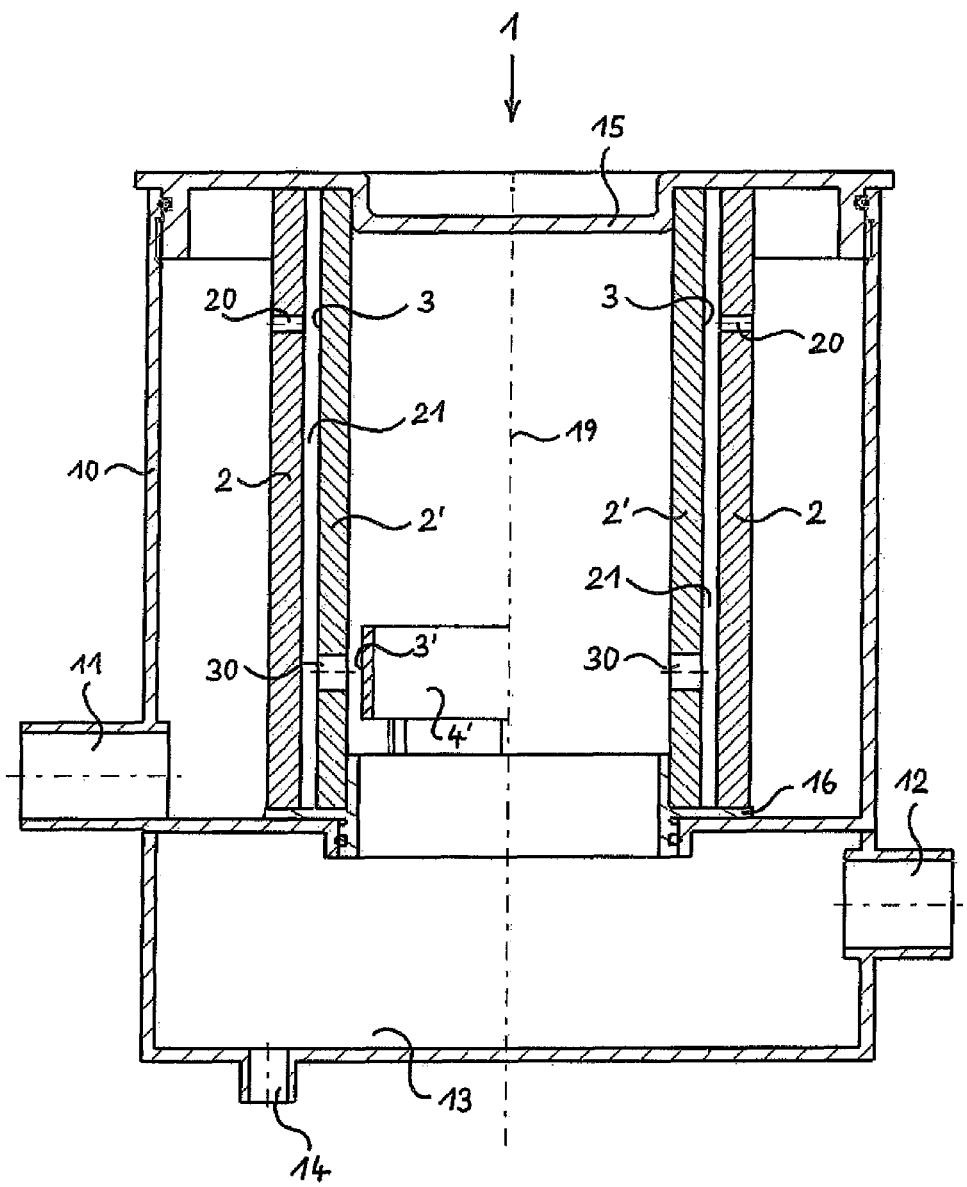
FIG. 2 shows the oil mist separator in two further embodiments, in longitudinal section.

FIG. 2 shows further embodiments of the oil mist separator 1, with two different embodiments being presented in the left and in the right half of FIG. 2. The housing 10 with the crude gas inlet 11, the pure gas outlet 12, the oil collection area 13 and the oil discharge 14, as well as the cover 15 corresponds with the embodiment according to FIG. 1.

Different from the oil mist separator 1 according to FIG. 1 is that in the embodiment according to FIG. 2 the outer diffusion separation body 2 and the inner diffusion separation body 2' here have the same axial length or height so that both diffusion separation bodies 2 and 2' jointly stand with their bottom front end on the base plate 16. On the top side, the front ends of both diffusion separation bodies 2 and 2' rest against the underside of cover 15 and are glued on or fused there, in the same way as on the base plate 16.

In the embodiment according to FIG. 2, the radially outer diffusion separation body 2 corresponds with the embodiment according to FIG. 1. The radially inner separation body 2' has, in its lower area—thus with a relatively large axial displacement to the gas channels 20 lying above in the outer diffusion separation body 2—one or a plurality of gas passages 30 in the form of relatively large openings here. The gas passages 30 allow a low resistance gas flow so that the flow resistance of the oil mist separator 1 is kept overall advantageously low even if the diffusion separation bodies 2 and 2' are heavily burdened.

As suggested in the left half of FIG. 2, a further impingement separation surface 4' can be provided radially inside from the gas passage 30. In this embodiment, the impingement separation surface 4' has a radially outer surface 3' of an annular, hollow-cylindrical impingement plate as an effective separation surface which is here subdivided in circumferential direction into several sections, especially one section per gas passage 30. The sections of the impingement plate 4' are connected with the base plate 16 via radially resilient, axially extending connection webs to keep it in the presented position and at the same time allow a resilient movement in radial direction. With a minor pressure drop over the oil mist separator 1, the impingement separation surface 4' first rests radially inside against the inner diffusion separation body 2' and then covers the gas passage 30.

With the oil mist separator 1 according to FIG. 2 and in fresh condition of the diffusion separation bodies 2 and 2', the oil mist separation here also occurs quite predominantly by deposition of the oil particles in the diffusion separation bodies 2 and 2', thus by means of diffusion separation. With the increasing burdening of the diffusion separation bodies 2 and 2' during the operating period of the oil mist separator 1, here again an increasingly larger partial volume flow of the crankcase ventilation gas flows through the gas channels 20 in the outside diffusion separation body 2, whereby an impingement separation occurs on the surface 3 which is formed by the radially outer surface of the inner diffusion separation body 2'. Through the inner diffusion separation body 2', a first part of the crankcase ventilation gas flows radially to the inside, and through the annular gap 21 between the two diffusion separation bodies 2 and 2', a second part of the crankcase ventilation gas flows axially downwardly and then radially toward the inside through the at least one gas passage 30, where another impingement separation takes place if necessary. Finally, the reunited total gas flow flows further axially downwardly through the open base plate 16 and then to the pure gas outlet 12. In this operating condition, the gas flow pushes the impingement separation surface 4'—due to the increasingly higher pressure drop over the oil mist separator 1—against its resetting force radially away from the gas passage 30 towards the inside so that the gas passage 30 is now free, as presented in the left half of FIG. 2.

Figure 3:
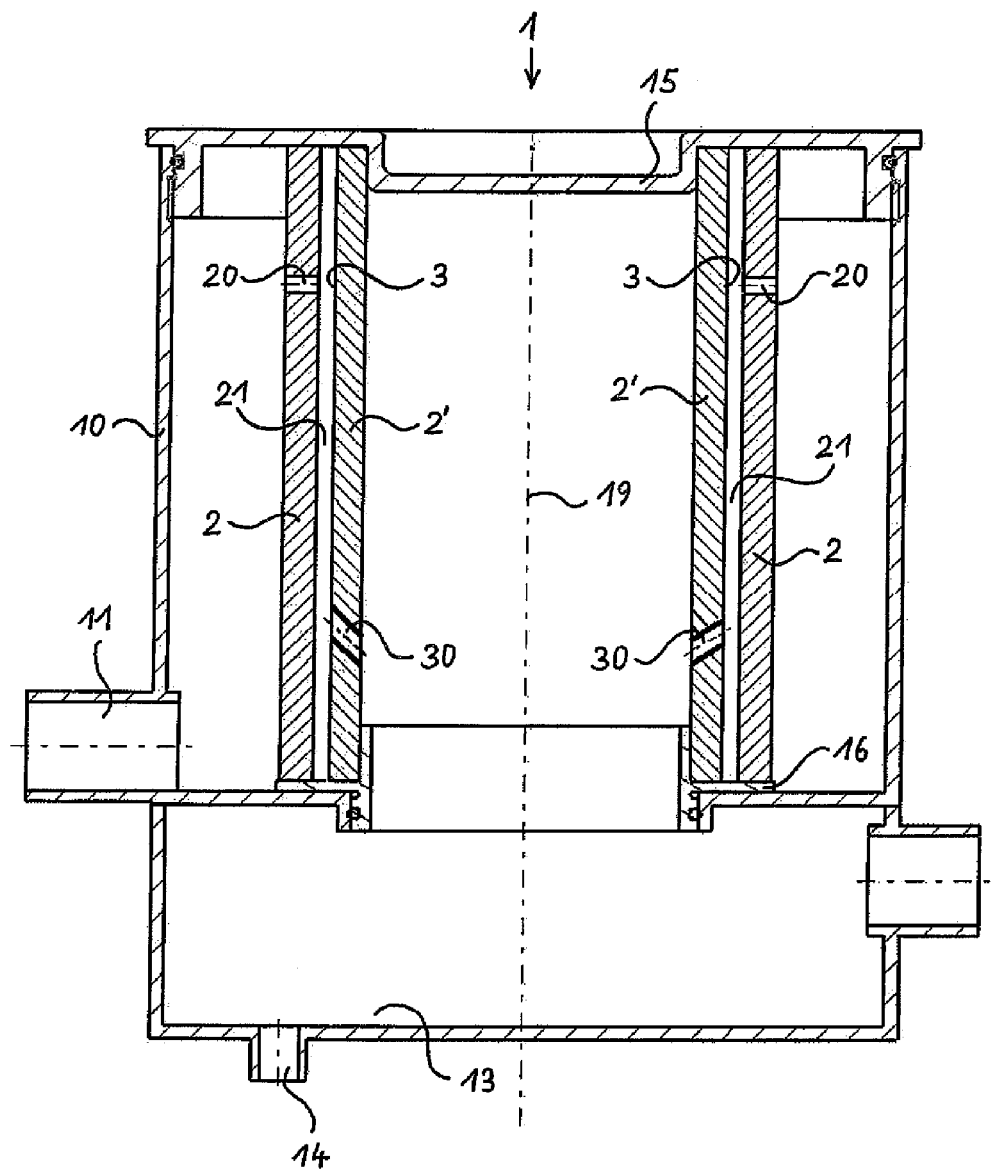
FIG. 3 shows the oil mist separator in a fourth embodiment, in longitudinal section.

FIG. 3 shows an exemplary embodiment of the oil mist separator 1 which corresponds in large parts with the embodiment presented in the right half of FIG. 2. The difference is that in the embodiment of the oil mist separator 1 according to FIG. 3, the gas passages 30 are formed by inclined extending channels, with the channels 30 being designed—seen in radial direction from the outside to the inside—extending angularly downwardly. This avoids sharp flow deflections in the area of the gas passages 30 which would result in an increase of the flow resistance. Otherwise, the exemplary embodiment of the oil mist separator 1 according to FIG. 3 is equivalent to the above described embodiments.

Figure 4:
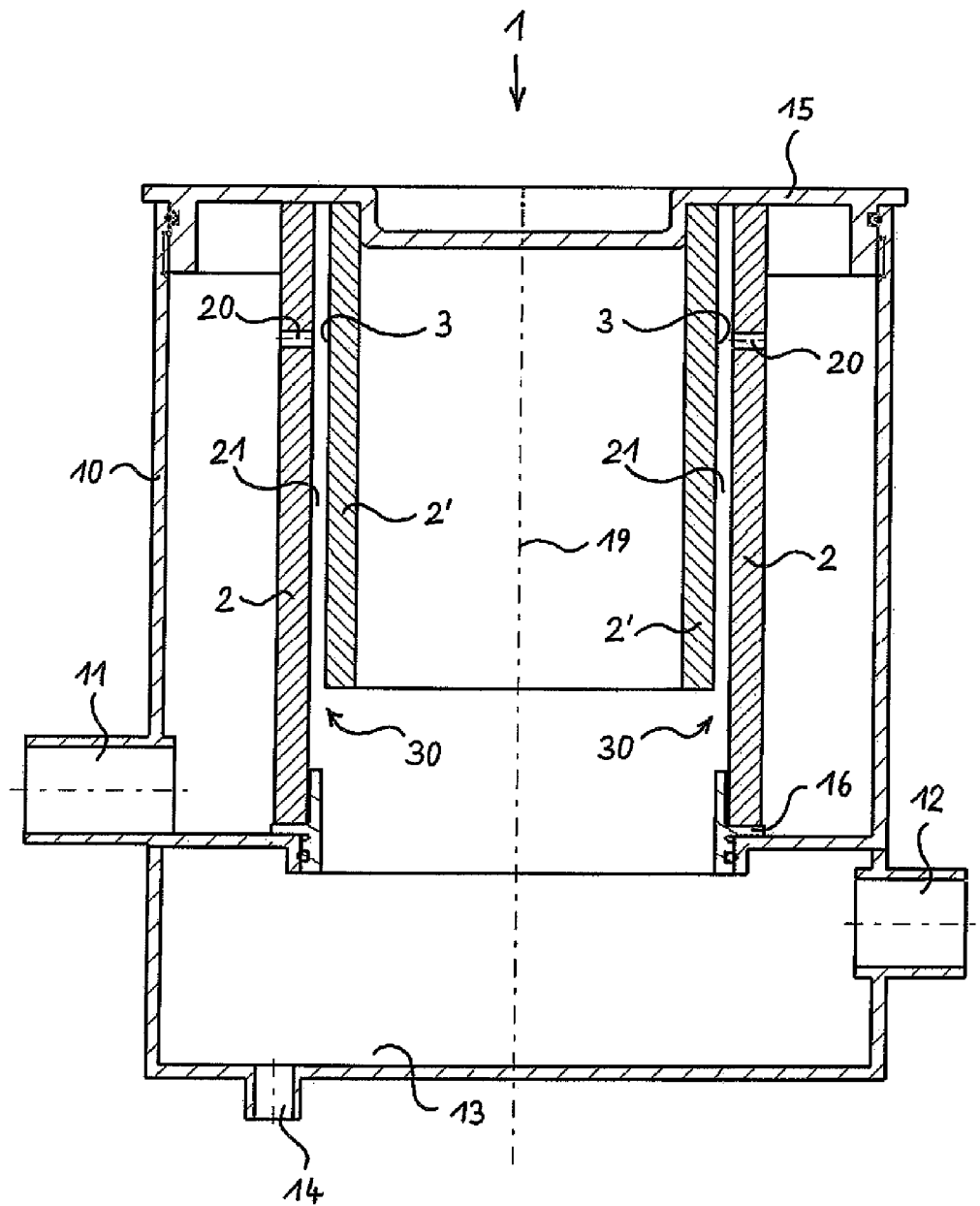
FIG. 4 shows the oil mist separator in a fifth embodiment, in longitudinal section.

FIG. 4 shows an exemplary embodiment of the oil mist separator 1 which corresponds in large parts to the exemplary embodiment of the oil mist separator 1 according to FIG. 1. What is different in the embodiment according to FIG. 4 versus FIG. 1 is that the base plate 16 is designed differently. In the embodiment according to FIG. 4, the base plate has a maximum sized central opening which here provides a particularly large flow cross-section for the de-oiled crankcase ventilation gas flowing off from the inner area of the inner diffusion separation body 2' and from the annular gap 21, on its way to the pure gas outlet 12. With regard to the other details in FIG. 4, reference is made to the preceding description of the figures.

Figure 5:
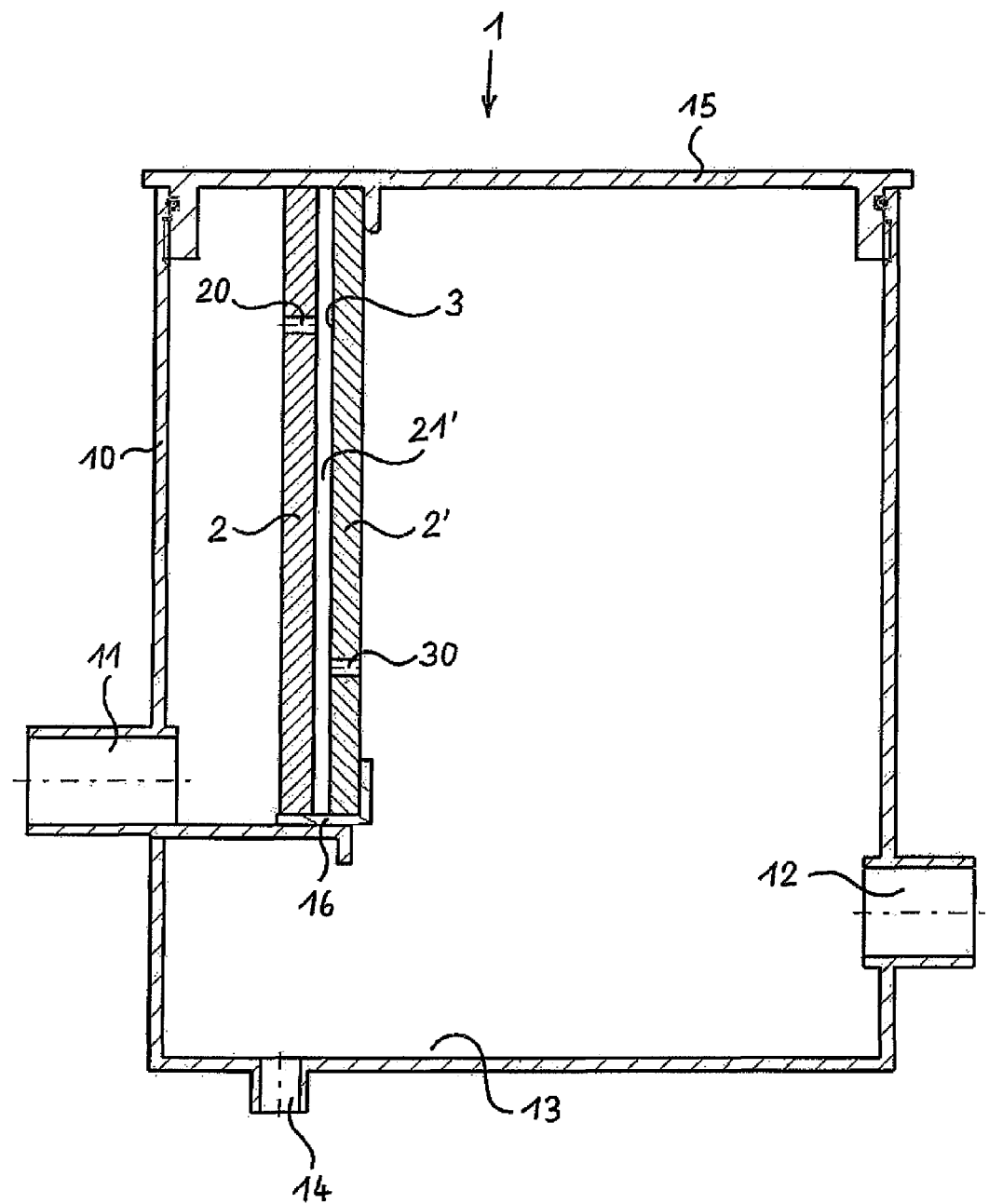
FIG. 5 shows the oil mist separator in a sixth embodiment, in longitudinal section.

FIG. 5 shows an embodiment of the oil mist separator 1 in which the diffusion separation bodies 2 and 2' are designed flat and in plate shape. The two diffusion separation bodies 2 and 2' are located side by side in two parallel extending, vertical levels, while keeping free a flat, level gap space 21'.

The two diffusion separation bodies 2 and 2' are here also arranged in a housing 10 into which the crankcase ventilation gas to be de-oiled is introduced via the crude gas inlet 11. In fresh condition of the diffusion separation bodies 2 and 2', the oil separation is provided entirely or far predominantly by means of diffusion separation within the diffusion separation bodies 2 and 2'. With increased burdening of the diffusion separation bodies 2 and 2', an increasingly larger partial flow of the crankcase ventilation gas flows here as well through the gas channels 20 provided in the upper area of the first diffusion separation body 2. In the present embodiment according to FIG. 5, the gas channels 20 are arranged one after the other perpendicularly to the drawing plane, and accordingly in FIG. 5, only a single gas channel 20 is visible. If necessary, several rows of gas channels 20 can also be arranged on top of (vertically spaced relative to) each other. The partial flow of crankcase ventilation gas flowing through the gas channels 20 strikes the surface 3 which is here formed by the surface of the second diffusion separation body 2' facing the first diffusion separation body 2. This partial flow of crankcase ventilation gas is freed from oil droplets by means of impingement separation. Then, the crankcase ventilation gas partly flows through the second diffusion separation body 2' according to FIG. 5 towards the right and partly through the gap space 21' between the diffusion separation bodies 2 and 2' downwardly and then through the at least one gas passage 30 in the second diffusion separation body 2' also towards the right, from where the now de-oiled crankcase ventilation gas can flow off overall through the pure gas outlet 12. A lower area of the housing 10 here also forms an oil collection area 13 from where the separated oil can be discharged through the oil drain 14.

A base plate 16 is here also used for mounting and positioning of the two flat, plate-shaped diffusion separation bodies 2, 2'; the two diffusion separation bodies 2 and 2' stand on said base plate 16 with their bottom edge. Another positioning is provided by the cover 15 which is connected on its underside with the top edge of the two diffusion separation bodies 2 and 2'. Thus, the diffusion separation bodies 2 and 2' also form—together with the cover 15—a connected unit which allows a simple replacement of the diffusion separation bodies 2 and 2' within the scope of maintenance work.

Figure 6:
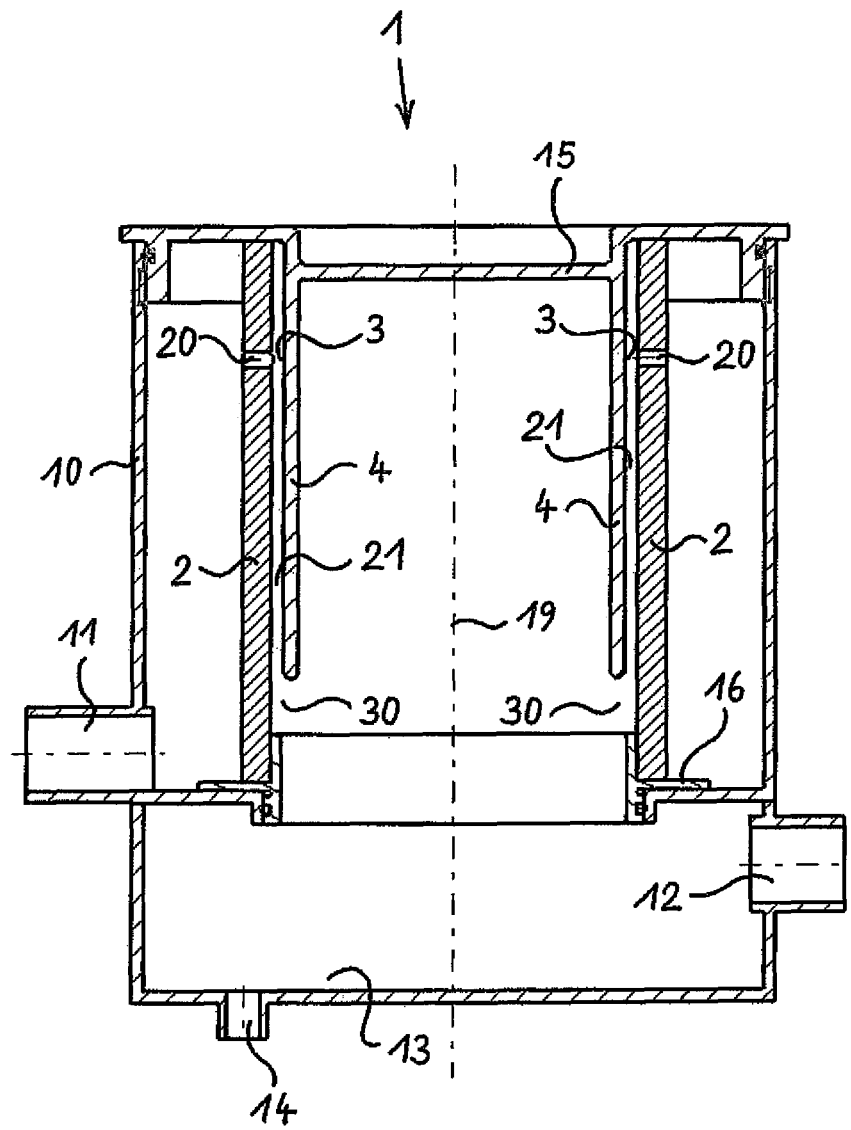
FIG. 6 shows the oil mist separator in a seventh embodiment, in longitudinal section.

In contrast to the aforementioned exemplary embodiments, the exemplary embodiment of the oil mist separator 1 shown in FIG. 6 has only one single diffusion separation body 2. Similar to the embodiments according to FIGS. 1 to 4, this diffusion separation body 2 is here again designed as a hollow cylinder.

Radially inside from the diffusion separation body 2, an also hollow-cylindrical impingement separation surface 4 is arranged with a radially outer, separation-effective surface 3 which extends—like the diffusion separation body 2—concentrically to the center axis 19 of the oil mist separator 1. For reasons of simple manufacturing, the hollow-cylindrical impingement separation surface 4 is here provided in one piece with the cover 15 of the housing 10.

On the left in FIG. 6, the crude gas inlet 11 is also provided here through which crankcase ventilation gas to be de-oiled is passed to the oil mist separator 1. In the fresh condition of the diffusion separation body 2, the crankcase ventilation gas flows entirely or far predominantly through the diffusion separation body 2, whereby the entrained oil particles are separated by means of diffusion separation within the diffusion separation body 2.

With an increasing burden of the diffusion separation body 2, here again an increasingly larger share of the crankcase ventilation gas flows through the gas channels 20 which here too extend in the upper area of the diffusion separation body 2 in radial direction through it. The radially outer surface 3 of the impingement separation surface 4 now forms a surface which is hit by the partial flows of the crankcase ventilation gas flowing through the gas channels 20 which effects an impingement separation of entrained oil particles from the gas flow.

Here again, it is thus achieved that—after an oil mist separation by means of diffusion separation on the inside of the diffusion separation body 2 upon its increasing burden—more and more of the gas flow passes through the gas channels with the oil mist separation then also being effected, now by means of an impingement separation. Accordingly, the oil mist separator 1 in its embodiment according to FIG. 6 also has a high efficiency with a long service life.

The crankcase ventilation gas flowing not only through the diffusion separation body 2 but also through the gas channels 20 and being de-oiled thereafter passes through the gas passage 30 at the lower end of the impingement plate 4 into the radially inner area of the housing 10 and from there through the here also open base plate 16 to the pure gas outlet 12.

Separated oil flows, here as well, under the effect of gravity into the oil collection area 13 formed on the bottom in housing 10, from where an oil drain 14 again discharges the collected oil.

For the purpose of simple maintenance of the oil mist separator 1, the diffusion separation body 2 is here also connected on its upper front end with the underside of the cover 15. The lower front end of the diffusion separation body 2 is connected with the base plate 16 whereby the diffusion separation body 2, the cover 15 with the impingement plate 4 and the base plate 16 form a replaceable unit.

Figure 7:
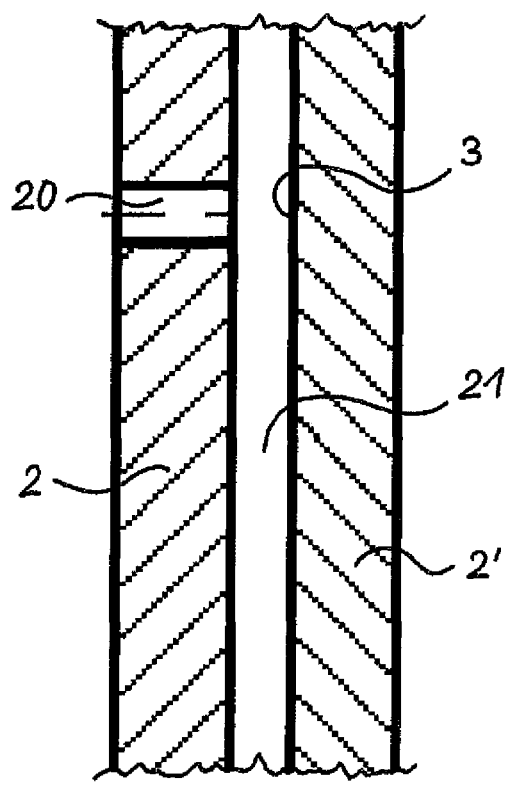
FIG. 7 shows a detail of the oil mist separator with a section from two diffusion separation bodies and with a gas channel, in an enlarged presentation in longitudinal section.

In an enlarged presentation, FIG. 7 shows a detail from one of the oil mist separators according to the FIGS. 1 to 5. The detail according to FIG. 7 in this case shows a section from the two diffusion separation bodies 2 and 2' with a gas channel 20 extending through the diffusion separation body 2. In the embodiment according to FIG. 7, the gas channel 20 is formed directly in the diffusion separation body 2, for example by fusing in or welding in or drilling in or punching in. For a diffusion separation body 2 of a thermoplastic material, melting in the gas channels 20 advantageously results in a reinforced surface of the gas channels 20, and they thus obtain good form stability without any special measures.

The further diffusion separation body 2' arranged in FIG. 7 on the right of the diffusion separation body 2 forms—with its surface 3 facing the first diffusion separation body 2—in the area of the gas channel 20, the impingement area on which the impingement separation of oil particles takes place with increasingly burdened diffusion separation bodies 2 and 2', said particles being entrained in the gas flow of the crankcase ventilation gas flowing through the gas channel 20. The annular gap 21 is located between the two diffusion separation bodies 2 and 2'.

Figure 8:
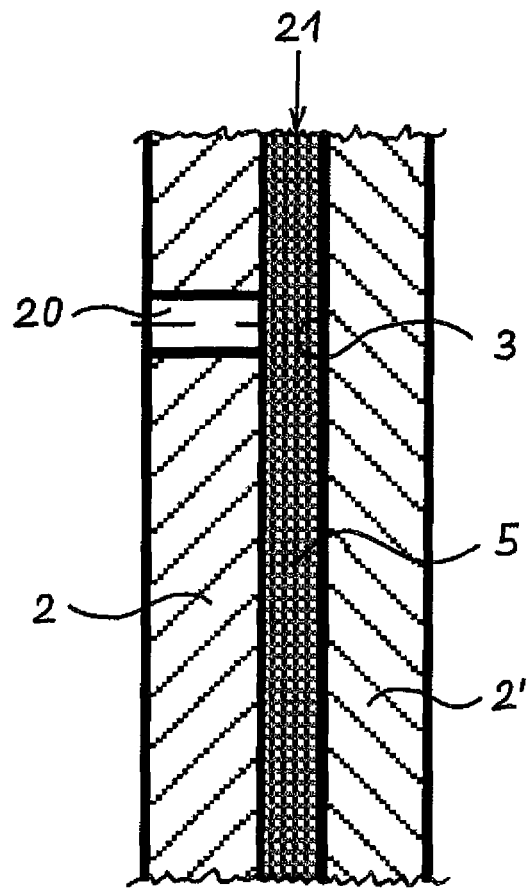
FIG. 8 shows the detail of FIG. 7 in a changed embodiment, in the same mode of presentation as in FIG. 7.

In the same mode of presentation as in FIG. 7, FIG. 8 shows a changed embodiment. The difference to FIG. 7 is that, in the embodiment according to FIG. 8, a supporting body 5 is arranged in the annular gap 21 between the two diffusion separation bodies 2 and 2'. This supporting body 5 is expediently formed by a three-dimensional grid which keeps the annular gap 21 open and prevents a deformation of the diffusion separation bodies 2 and 2' in operation. The spatial structure of the supporting body 5 is, of course, designed such that the lowest possible resistance in the flow of the crankcase ventilation gas remains possible alongside the annular gap 21. As a supplement, the supporting body 5 can have a flow guiding function and/or oil separation function by means of a corresponding provision of form and structure.

Figure 9:
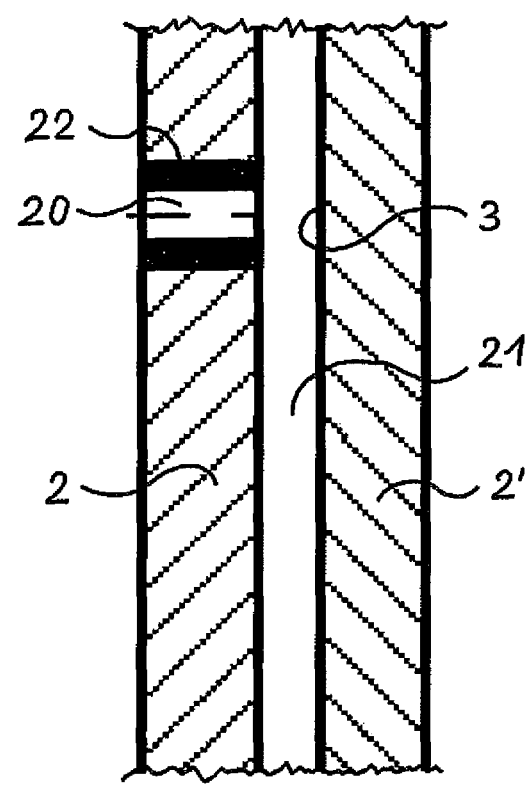
FIG. 9 shows the detail of FIG. 7 in another embodiment, in the same mode of presentation.

Again in the same mode of presentation as in FIGS. 7 and 8, FIG. 9 shows another exemplary embodiment. It is characteristic for this embodiment that the gas channels 20 are here formed by means of sleeves 22 inserted into the first diffusion separation body 2. In this manner, the gas channels 20 obtain a permanently consistent contour which can moreover be manufactured with high precision.

Figure 10:
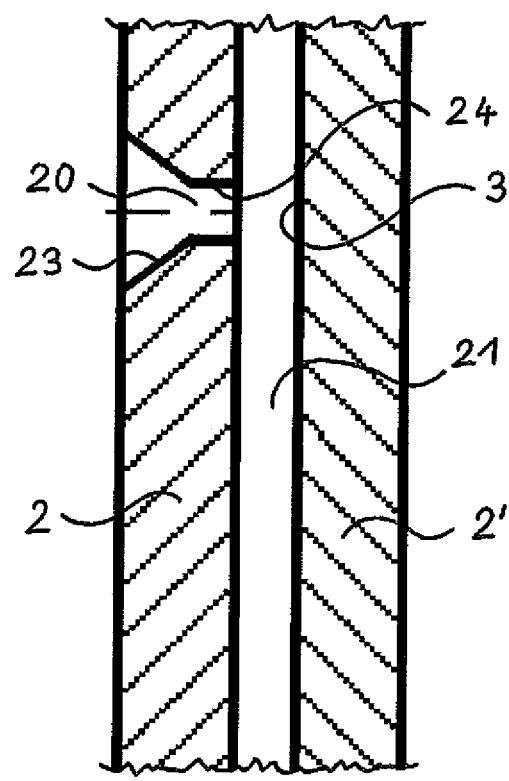
FIG. 10 shows the detail of FIG. 7 in another changed embodiment, again in the same mode of presentation.

In the same mode of presentation as in FIGS. 7 to 9, FIG. 10 shows an example in which the gas channels 20 are designed on the side of the admission flow, i.e. in FIG. 10 on the left, with an admission funnel 23. Relative thereto, the part of the gas channel 20 following in the direction of the gas flow—thus on the right side in FIG. 10—forms a constriction 24 due to which the gas channel 20 has a nozzle-like appearance. This achieves, on the one hand, a low turbulence admission of the crankcase ventilation gas into the gas channel 20 and, on the other hand, with a heavily burdened diffusion separation body 2, a high gas flow speed in the area of the constriction 24 of the gas channel 20 which provides for a good impingement separation at low flow resistance.

Figure 11:
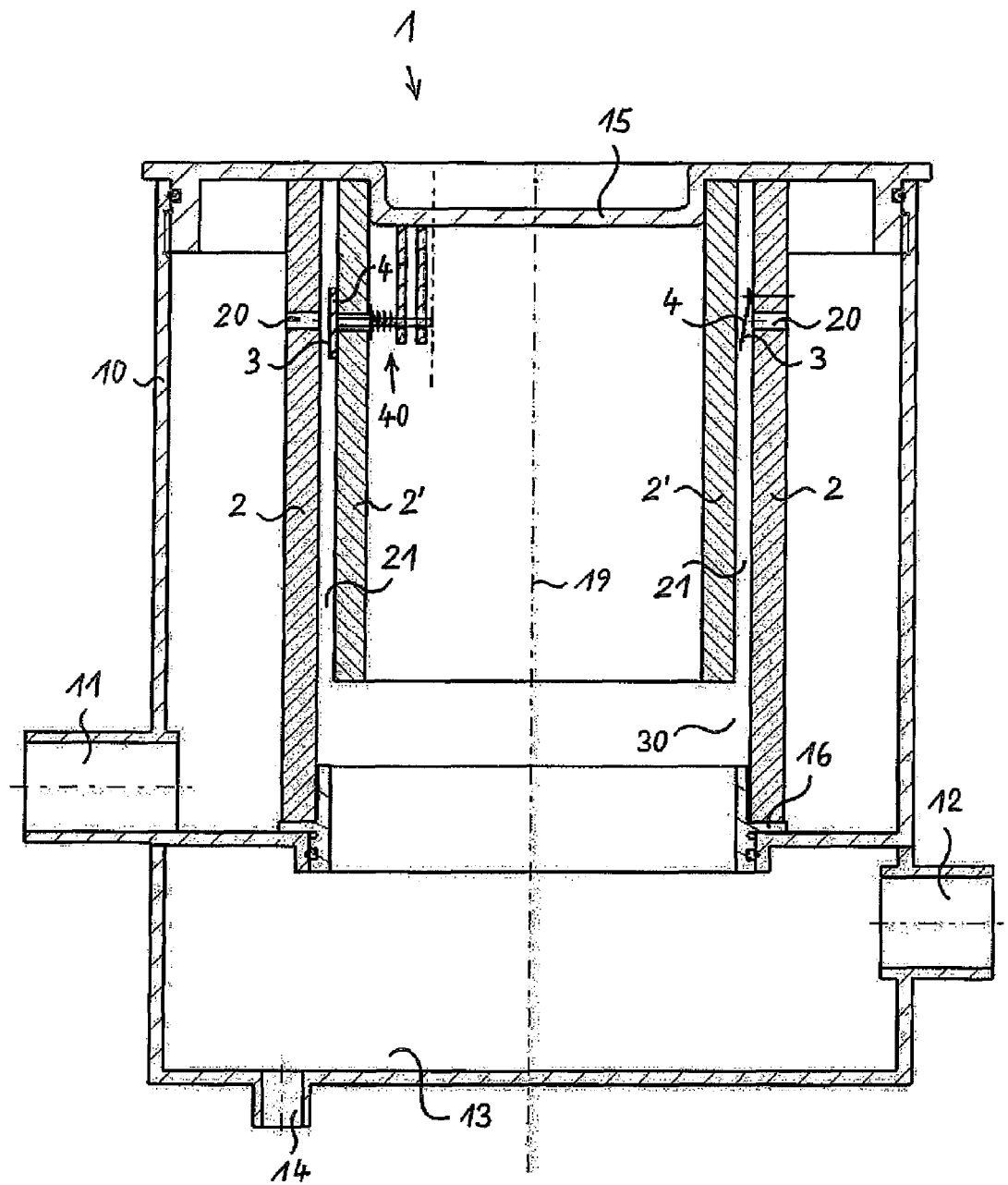
FIG. 11 shows the oil mist separator in an eighth embodiment, in longitudinal section.

FIG. 11 shows a modification of the exemplary embodiment according to FIG. 1, and in the left half of FIG. 11, an impingement separation surface 4 is shown held in a spring bearing 40 with a surface 3 facing the gas channel 20. With a minor pressure drop—thus with a fresh diffusion separation body 2—the surface 3 rests, under the effect of a spring of the bearing 40, on the radially inner side of the diffusion separation body 2 and blocks the gas channel 20. The entire gas flow now flows inevitably through the diffusion separation body 2; and at least one partial flow of the gas subsequently flows through the inner, further diffusion separation body 2'.

With an increasing pressure drop—thus with an increasingly burdened diffusion separation body 2—the increasing pressure difference pushes the impingement separation surface 4 against the spring force away from the diffusion separation body 2, and the surface 3 gets the distance from the diffusion separation body 2 presented in FIG. 11. Now, the gas channel 20 is free and there is an adequate crankcase ventilation with de-oiling of the gas by means of diffusion separation in the second diffusion separation body 2' and by impingement separation on the surface 3.

As presented on the right in FIG. 11, the impingement separation surface 4 can alternatively be designed as a laminar valve from a flexible metal lamina or fleece lamina or elastomer lamina, each charged with a spring in closing direction or provided with its own reset force. The laminar valve is shown in its open position. The separation-effective surface 3 here is the surface of the lamina facing the diffusion separation body 2.

With regard to the other parts of FIG. 11, reference is made to the description of FIG. 1.

Figure 12:
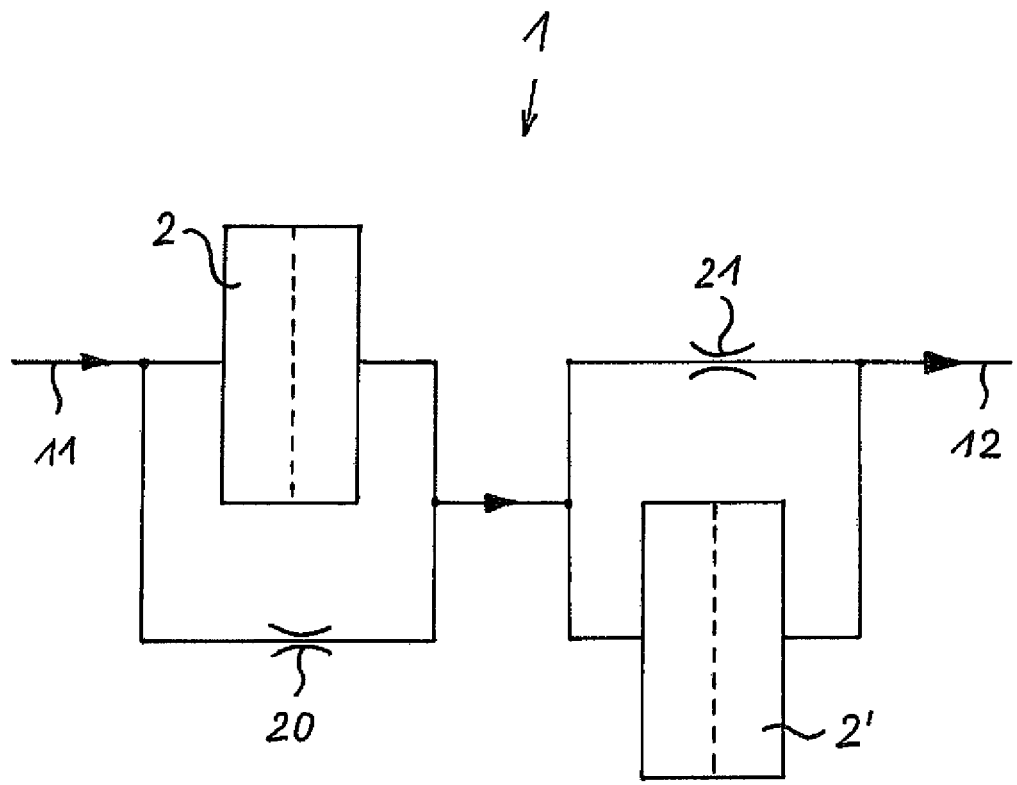
FIG. 12 shows a schematic diagram of the oil mist separator according to FIG. 1.

FIG. 12 shows a schematic diagram of the oil mist separator 1 according to FIG. 1. On the left is the crude gas inlet 11 through which crankcase ventilation gas is introduced which is burdened with oil mist. The gas flow flows parallel through the diffusion separation body 2 and the free gas channels 20, with the latter acting like a throttle. The ratio of the partial flows adjusts itself according to the ratio of the flow resistances between the separation body 2 and the free gas channels 20. With a fresh, unburdened separation body 2, the by far largest part of the gas flows through the separation body 2; with an increasing burden of the separation body 2, an increasing part of the gas flows through the free gas channels 20 so that a gas flow always remains ensured. In the direction of flow behind the diffusion separation body 2 and the gas channels 20, the two partial gas flows are combined again and then arrive at the parallel switching from the second diffusion separation body 2' and the annular gap 21 which also functionally acts as a throttle. Here again, the ratio of the partial flows between the separation body 2' and the annular gap 21 adjusts itself in accordance with their flow resistances. With a fresh, unburdened separation body 2', the by far greater partial flow flows through this separation body 2'; with increased burdening of this second separation body 2' as well, an increasing partial flow of the crankcase ventilation gas flows through the annular gap 21 acting as a throttle. Downstream from the second separation body 2' and the annular gap 21, the crankcase ventilation gas flow is reunited and now arrives de-oiled in the pure gas outlet 12. Even with heavily or maximum burdened separation bodies 2 and 2', a sufficiently large flow cross-section remains through the gas channels 20 and the annular gap 21 so that adequate crankcase ventilation is always ensured. An unacceptably high pressure in the crankcase housing is thus safely prevented.

Figure 13:
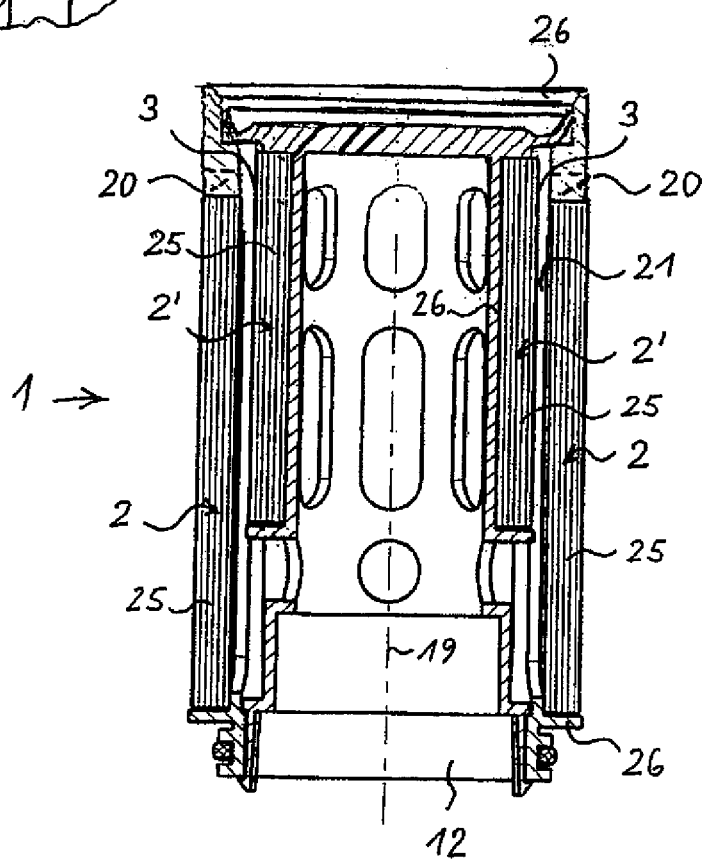
FIG. 13 shows the oil mist separator in a ninth embodiment, in longitudinal section.

FIG. 13 shows an embodiment of an oil mist separator 1 which again comprises two concentrically arranged hollow-cylindrical diffusion separation bodies 2 and 2'. The separation bodies 2 and 2' are each formed by a fiber body 25, with the fiber bodies 25 being carried by a carrying body 26 which is here designed in multiple parts. Here, the crude gas flows in from the radially outside and first flows through the outer diffusion separation body 2 and subsequently through the inner diffusion separation body 2'.

The free gas channels 20 are here designed in a transitional area from the upper front end of the outer separation body 2 to a facing side of the upper part of the carrying body 26.

Figure 14:
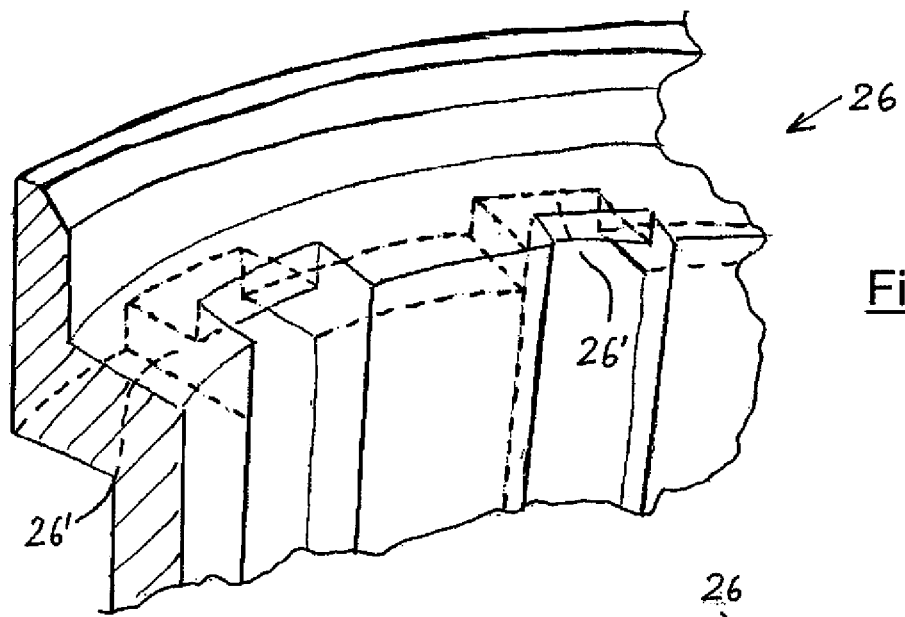
FIG. 14 shows an enlarged detail of the oil mist separator of FIG. 13.

In an enlarged detail from the upper part of the carrying body 26, FIG. 14 shows its design. It is here evident that open grooves 26' extending in radial direction are designed in the carrying body 26 which are limited in circumferential direction and upwardly by the material of the carrying body 26 and which are axially downwardly initially open. After connection of the fiber body 25 with the carrying body 26, the grooves 26' are limited downwardly by means of the upper front end of the fiber body whereby the desired free gas channels 20 are formed.

The mode of functioning of the oil mist separator 1 according to FIG. 13 corresponds to that of the exemplary embodiment according to FIG. 1. With regard to the further parts in FIG. 13, reference is therefore made to the description of FIG. 1.

Figure 15:
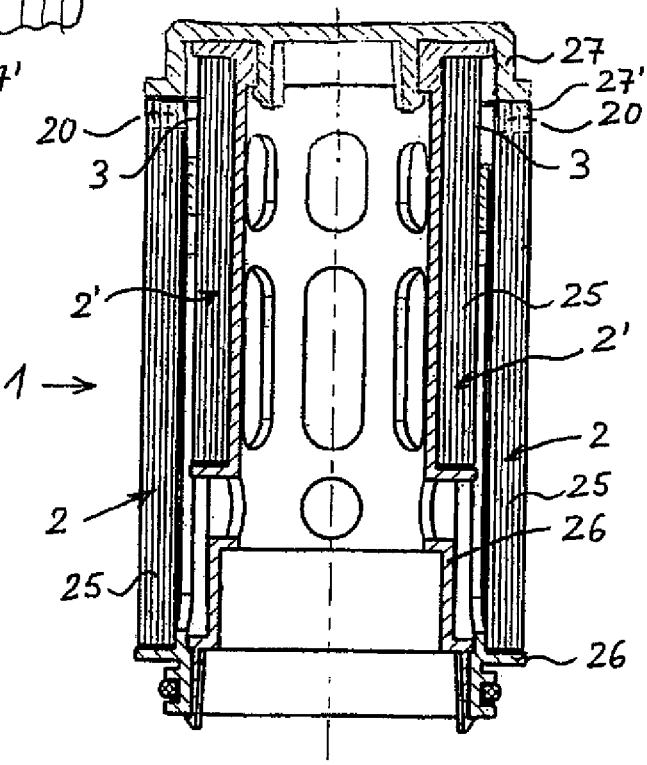
FIG. 15 shows the oil mist separator in a tenth embodiment, in longitudinal section.

FIG. 15 also shows in a longitudinal section another embodiment of the oil mist separator 1 which corresponds in further parts with the oil mist separator 1 according to FIG. 13. Different is the type and manner of how the free gas channels 20 are designed in the oil mist separator 1 according to FIG. 15.

With the oil mist separator according to FIG. 15, the carrying body 26 is designed in multiple parts with an upper, initially separate carrying body part 27 which is connectable, here latchable, with the remaining carrying body 26.

The carrying body part 27 has—on its side facing the upper front end of the fiber body 25 of the outer diffusion separation body 2, and distributed in circumferential direction—a plurality of studs 27' downwardly projecting in axial direction, or noses, or similarly suitable projections. These studs 27 take care that, when the carrying body part 27 is mounted, the material of the fiber body 25 is partially compressed in axial direction. Since the studs 27' are designed very steeply on one side according to FIG. 16—i.e. with an incline approximately at right angles to the face of the carrying body part 27, the material of the fiber body 25 cannot follow this incline and the desired free gas channels 20 are formed thereby.

Figure 17:
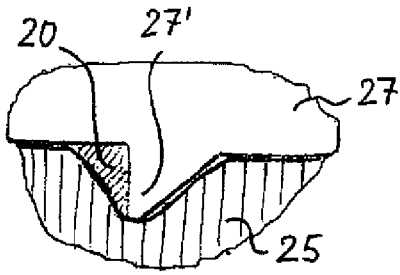
FIG. 17 shows a detail of the oil mist separator of FIG. 15, in a side view.

This effect is presented in FIG. 17 in an enlarged detail. In FIG. 17 at the top, a detail of the carrying body part 27 is to be seen from which one of the studs 27' projects downwardly. The stud 27' presses in axial direction into the fiber body 25 which cannot follow the stud 27' precisely in its contours; and on the left side of the left flank of stud 27', an approximately triangular free cross-section is thereby made free as gas channel 20 and kept free.

Figure 16:
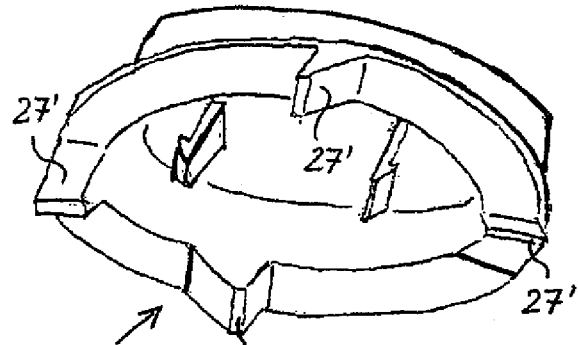
FIG. 16 shows a carrying body part as an enlarged detail of the oil mist separator of FIG. 15, in a perspective view.
Figure 18:
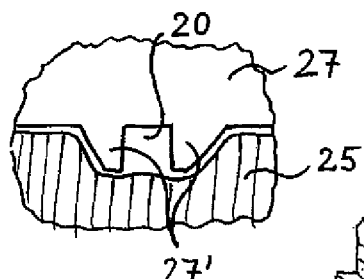
FIG. 18 shows the detail of FIG. 17 in a changed embodiment, also in a side view.

FIG. 18 shows a modification of the carrying body part 27 from FIG. 16. In FIG. 18, instead of individual studs 27', pairs of two studs 27' each are provided which are mirror-symmetrically designed to each other with the steep flanks of studs 27' facing each other. In this manner, gas channels 20 which are in cross-section approximately rectangular or square are made free and kept free when the carrying body part 27 is mounted on the remaining carrying body 26.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

LIST OF REFERENCE SYMBOLS

Reference Designation
1 Oil mist separator
10 Housing
11 Crude gas inlet
12 Pure gas outlet
13 Oil collection area
14 Oil drain
15 Housing cover
16 Base plate
19 Center axis
2, 2' Diffusion separation bodies
20 Gas channels
21 Annular gap
21' Gap space
22 Sleeves
23 Admission funnel
24 Constriction
25 Fiber body
26 Carrying body
26' Grooves
27 Carrying body part
27' Studs
3, 3' Surfaces
30 Gas passage
4, 4' Impingement separation surfaces
40 Spring bearing
41 Valve
5 Supporting body

The invention claimed is:
1. An oil mist separator of an internal combustion engine, comprising:

at least one gas-permeable diffusion separation body, through which a crankcase ventilation gas of the internal combustion engine can flow in a flow direction and in which oil mist present in the crankcase ventilation gas can be separated from the gas by diffusion separation, a plurality of continuous free gas channels formed in the at least one diffusion separation body, and in the flow direction of the crankcase ventilation gas following the gas channels at least one of a further diffusion separation body and an impingement separation surface is disposed at a distance from the at least one diffusion separation body.

2. An oil mist separator according to claim 1, wherein the gas channels extend perpendicularly to a surface plane of the diffusion separation body and the at least one of the further diffusion separation body or the impingement separation surface extends parallel to the surface plane of the diffusion separation body.

3. An oil mist separator according to claim 1, wherein at least one gas passage is arranged downstream of the at least one of the further diffusion separation body and the impingement separation surface to the gas channels of the diffusion separation body, in a staggered fashion.

4. An oil mist separator according to claim 3, wherein in the flow direction of the crankcase ventilation gas, at least one of a further diffusion separation body and a further impingement separation surface is provided following the gas passage at a distance from it.

5. An oil mist separator according to claim 1, wherein at least one of the impingement separation surfaces is formed by a closed, gas-and oil-tight impingement plate.

6. An oil mist separator according to claim 1, wherein the at least one diffusion separation body and the impingement separation surface each have a hollow cylindrical form and are arranged concentrically to each other around a center axis.

7. An oil mist separator according to claim 1, wherein the at least one diffusion separation body and the impingement separation surface are each spirally arranged seen in cross-section.

8. An oil mist separator according to claim 1, wherein the at least one diffusion separation body and the impingement plate have a flat planar form and are arranged in parallel to each other.

9. An oil mist separator according to claim 1, wherein at least one gas- and oil-permeable supporting body is arranged between the at least one diffusion separation body and the at least one of a further diffusion separation body and an impingement surface.

10. An oil mist separator according to claim 9, wherein the supporting body is formed by a three-dimensional grid.

11. An oil mist separator according to claim 9, wherein the supporting body has a form which has at least one of a gas guiding function for the gas flowing through the supporting body and a separating function for the oil mist contained in the gas flowing through the supporting body.

12. An oil mist separator according to claim 1, wherein the at least one separation body comprises at least one body made of one of fiber and foam.

13. An oil mist separator according to claim 12, wherein a material forming the separation body is sheet-formed in its initial condition and has a smaller thickness than the body and the sheet-formed material is wound on itself to form the body.

14. An oil mist separator according to claim 9, wherein the at least one diffusion separation body comprises at least one body made of one of fiber and foam and a material forming the fiber or foam body is sheet-formed in its initial condition and has a thickness corresponding to the thickness of the fiber or foam body and the sheet-formed material is wound together in spiral form with the supporting body, also sheet-formed in an initial condition, to the at least one fiber or foam body.

15. An oil mist separator according to claim 12, wherein each separation body has the form of a hollow profile.

16. An oil mist separator according to claim 12, wherein each diffusion separation body comprises, in addition to the at least one fiber or foam body, a carrying body carrying the fiber or foam body.

17. An oil mist separator according to claim 12, wherein each fiber body is manufactured of a felt material from at least one material from the group consisting of thermoplastic or thermosetting plastic fibers, metal fibers, carbon fibers, glass fibers and a paper material.

18. An oil mist separator according to claim 12, wherein the fiber body is manufactured from at least one material from the group consisting of fleece, a fabric, a web, a textile, and a knit of thermoplastic or thermosetting plastic fibers, metal fibers, carbon fibers and glass fibers.

19. An oil mist separator according to claim 12, wherein the foam body is manufactured of one of a plastic, metal and glass foam.

20. An oil mist separator according to claim 19, wherein the foam body is manufactured of one of an open-cell thermoplastic and thermosetting foam plastic.

21. An oil mist separator according to claim 1, wherein each diffusion separation body comprises at least one sinter body.

22. An oil mist separator according to claim 1, wherein the gas channels are directly formed in the materials of the diffusion separation body by a process selected from the group consisting of molten, welded, drilled, punched or grooved and cut.

23. An oil mist separator according to claim 1, wherein the gas channels are formed by sleeves inserted into the material of the diffusion separation body.

24. An oil mist separator according to claim 1, wherein the diffusion body is carried on a carrying body and the gas channels are arranged in a transition area between at least one front end or edge of the diffusion body and an area neighboring the carrying body.

25. An oil mist separator according to claim 24, wherein the carrying body has grooves which are located on its side facing the diffusion body and which are limited by the front end or the edge of the diffusion body to form the gas channels.

26. An oil mist separator according to claim 24, wherein the carrying body has at least two parts and one carrying body part has, on its side facing the front end or edge of the diffusion body, at least two projecting studs which in a connected condition of the carrying body parts, partially push in the diffusion body on the edge and thus forms the gas channels.

27. An oil mist separator according to claim 1, wherein the gas channels are formed on the outlet side with a nozzle-like constriction.

28. An oil mist separator according to claim 1, wherein at least a portion of one of the further diffusion separation body or the impingement separation surface is adjustable relative to the gas channels against a reset force such that, at a differential pressure over the oil mist separator below a specifiable limit value, the gas channels are closed by the at least a portion and, at a differential pressure over the oil mist separator above a specifiable limit value, the gas channels are opened by displacing the at least portion against the reset force.

29. An oil mist separator according to claim 1, wherein at least one separate valve is allocated to at least one of the gas channels.

30. An oil mist separator according to claim 1, wherein the oil mist separator comprises a housing which is closed in operation with a removable housing cover and the at least one diffusion separation body is arranged an exchangeable unit.

* * * * *